US008218005B2

(12) United States Patent (10) Patent No.: US 8,218,005 B2
Royz et al. (45) Date of Patent: Jul. 10, 2012

(54) APPARATUS FOR MAKING A VIRTUAL MOVIE FOR USE IN EXPLORING A SITE

(75) Inventors: Gadi Royz, Tel Aviv (IL); Rony Amira, Rishon Lezion (IL)

(73) Assignee: Google Inc., Mountain View, CA (US)

( * ) Notice: Subject to any disclaimer, the term of this patent is extended or adjusted under 35 U.S.C. 154(b) by 926 days.

(21) Appl. No.: 12/160,050

(22) PCT Filed: Jan. 4, 2007

(86) PCT No.: PCT/IL2007/000012
§ 371 (c)(1),
(2), (4) Date: Oct. 14, 2008

(87) PCT Pub. No.: WO2007/077559
PCT Pub. Date: Jul. 12, 2007

(65) Prior Publication Data
US 2009/0174771 A1 Jul. 9, 2009

(30) Foreign Application Priority Data
Jan. 5, 2006 (IL) .......................................... 172995

(51) Int. Cl.
*H04N 7/18* (2006.01)
(52) U.S. Cl. ..................................................... 348/143
(58) Field of Classification Search ........................ None
See application file for complete search history.

(56) References Cited

U.S. PATENT DOCUMENTS
6,985,620 B2 * 1/2006 Sawhney et al. ............... 382/154
7,050,102 B1 * 5/2006 Vincent ..................... 348/333.02
(Continued)

FOREIGN PATENT DOCUMENTS
WO WO 2004/049263 A1 6/2004
(Continued)

OTHER PUBLICATIONS
European Patent Office, "European Search Report," mailed Dec. 14, 2011, (European App. No. 11181676.5, Filing Date: Sep. 16, 2011), 8 pages.
(Continued)

*Primary Examiner* — Asad Nawaz
(74) *Attorney, Agent, or Firm* — Sterne, Kessler, Goldstein & Fox P.L.L.C.

(57) ABSTRACT

A method for producing an interactive virtual movie which simulates the walking of a user within a real site and exploring the same. A scanning apparatus defines minimal conditions for the capturing of a new photograph, including one or more of: (i) displacement of the apparatus by a distance D; (ii) change of the apparatus orientation by an angle Δ°; or (iii) change of the orientation of the camera with respect to the apparatus by an angle of δ°. A photograph is captured each time the apparatus exceeds one of the predefined minimal conditions, wherein the measurements of the variables is reset after each capturing. The method also includes storing the captured photographs and forming open chains of those photographs captured during a common route photographing session, and forming closed chains, of photographs captured during a common junction photographing. For each of those first and last from among the closed chain photographs relating to the junction, a corresponding similar photograph is found meeting one of the criteria of highest correlation or having the closest field of view direction, and connecting between them.

11 Claims, 7 Drawing Sheets

U.S. PATENT DOCUMENTS

| | | | |
|---|---|---|---|
| 7,593,038 B2 * | 9/2009 | Ochiai | 348/208.6 |
| 2002/0093541 A1 | 7/2002 | Schileru-Key | |
| 2004/0239699 A1 | 12/2004 | Uyttendaele et al. | |
| 2006/0018017 A1 * | 1/2006 | Takahashi | 359/466 |
| 2006/0028548 A1 * | 2/2006 | Salivar et al. | 348/143 |
| 2006/0082656 A1 * | 4/2006 | Ochiai | 348/207.99 |
| 2008/0158341 A1 * | 7/2008 | Gelsomini et al. | 348/36 |
| 2008/0297360 A1 * | 12/2008 | Knox et al. | 340/628 |
| 2009/0115850 A1 * | 5/2009 | Nakamura | 348/169 |
| 2009/0180669 A1 * | 7/2009 | Horovitz et al. | 382/103 |
| 2009/0309765 A1 * | 12/2009 | Wang et al. | 341/20 |
| 2010/0215220 A1 * | 8/2010 | Yamaguchi et al. | 382/106 |
| 2011/0293255 A1 * | 12/2011 | Kikuchi et al. | 396/80 |

FOREIGN PATENT DOCUMENTS

| | | |
|---|---|---|
| WO | WO 2005/121859 A2 | 12/2005 |

OTHER PUBLICATIONS

Bourque et al., "Robotic Sightseeing—A Method for Automatically Creating Virtual Environments," Proceedings of the 1998 IEEE International Conference on Robotics & Automation, Leuven, Belgium (May 1998), IEEE, vol. 4, pp. 3186-3191 (May 16, 1998).

* cited by examiner

APPARATUS FOR MAKING A VIRTUAL MOVIE FOR USE IN EXPLORING A SITE

FIELD OF THE INVENTION

The field, of the invention relates to systems and methods for the preparation of interactive movies. More particularly, the invention relates to a method and system for producing an interactive movie, which is made particularly for the purpose of enabling a user to virtually navigate within a physical site, such as a building, office, etc.

BACKGROUND OF THE INVENTION

Virtual movies are widely used for a variety of purposes, such as exhibitions, remote guidance and touring of places, education, training, electronic games, etc. Some of such movies are animated, and some others are real, in the sense of involving real frames that are photographed within a real, physical site. The present invention relates to the latter case; i.e., where the preparation of a virtual and interactive movie enables a user to explore a real site.

For example, there are some cases in which it is desired to allow a user to watch a movie of a site, and navigate interactively within the site. More particularly, it is desired to have an interactive movie enabling the user to navigate within the site, i.e., simulating the walking to any possible direction he selects, while continuously watching actual images of the site. In some cases, the actual images may optionally be combined with computer-generated images relating to interactive or non-interactive events or objects.

In another, more particular example, it is desired to provide a virtual interactive movie for training individuals and to familiarize them with a specific site, while providing them with essential and comprehensive information about the site such as its layout, its appearance, location of rooms and equipment therein. Moreover, it could be beneficial to combine some simulations in the movie; e.g., a fire when training them how to deal with some emergency procedures. In another example, it is desired to provide possible real estate customers the ability to remotely and interactively navigate and explore real estate sites for sale. In still another example, it is desired to provide possible tourists the ability of exploring a hotel, before ordering the accommodation.

The preparation of a virtual, interactive movie which enables navigation within a site according to the typical prior art teachings is generally a very complicated task, and it involves a substantial effort, requiring professional and lengthy filming and editing. Also, the results are generally not particularly satisfactory, being far from providing to the user a real feeling.

WO 2004/049263 by same applicant filed on Nov. 24, 2003, the content of which is fully incorporated by reference, and which seems to be the closes prior art, discloses a system and method for virtual walkthrough. This application teaches the preparation of a virtual movie which simulates the walking of a user within a real site, in an essentially automatic manner. The method of WO 2004/049263 involves the following steps: (a) Defining first minimal conditions for the creation of a new node; (b) Defining second minimal conditions for linking between nodes; (c) Moving a scanning apparatus along routes within the site, measuring the x,y, displacement coordinates, and angular orientation of the scanning apparatus at any given time, and creating a new node at least whenever such first minimal conditions are met; (d) Obtaining an image data at each node location reflecting a camera unit field of view, and associating the said image data and its orientation with the x,y, location coordinates of the present node; (e) Finding and registering neighborhood links between pairs of nodes to generally create chains of nodes, each link assignment connecting between any two nodes satisfies at least said second minimal conditions required for linking between nodes, wherein more than one link may be assigned to a node; and (f) Further associating and registering with each created link an exit angular orientation from a first node in the pair and entry angular orientation to the second node in the pair. WO 2004/049263 suggests that the satisfying of any one of the conditions included in said first minimal conditions will result in the creation of a new node.

In one option, WO 2004/049263 suggests that one of said first minimal conditions is a maximal predefined displacement D between two nodes sampled by the apparatus.

In one option, WO 2004/049263 also suggests that one of said first minimal conditions is a maximal predefined allowed angular change $\delta°$ in the orientation of the apparatus after leaving a node.

In one option, the method of WO 2004/049263 further comprises the elimination or merging of nodes when some third conditions are met;

In one option of the method of WO 2004/049263, said third conditions comprise closeness of nodes below a predefined distance d.

In one option of the method of WO 2004/049263, each image data comprises a plurality of frames, and wherein each frame angular orientation is also registered.

In one option of the method of WO 2004/049263, the interactive virtual movie comprises: (a) A plurality of nodes; (b) Links connecting between nodes, wherein with each link between two nodes is associated with an exit angular indication from one node, and an entry angular indication to the other node, plurality of links may be associated with one node; (c) Image data reflecting a camera unit field of view for each node, and orientation indications for said image data.

In one option of the method of WO 2004/049263, the display of the movie comprises the steps of: (a) Providing to the user with means for selecting, turning, and advancing; (b) Displaying to the user a selected user field of view within the image data of a node; (c) When the user turns to a specific direction, displaying to the user the user field of view portion of the image data which corresponds to said specific direction; (d) When the user directs to one of the exit directions of the present node, and chooses to advance: displaying to the user a portion of the image data of the next node linked to said present node by said exit direction, said displayed portion of the image data corresponds to the entry direction associated with said link. (e) When the user selecting a node other than the present node, displaying to him a user field of view portion of the image data of said other node.

WO 2004/049263 also discloses an apparatus for producing an interactive virtual movie, which simulates the walking of a user within a real site, said apparatus comprises: (a) A movable platform; (b) Position and orientation unit for obtaining at any given time position and orientation of the platform, and providing the same to an imaging unit; (c) Imaging units for creating a node any time when some first minimal conditions are met, obtaining image data, and associating said image data and its orientation with the node location, thereby forming a node package; (d) Data unit for: (1) receiving node packages from the imaging unit; (2) calculating neighborhood between nodes; (3) registering links between found neighboring nodes, including registering for each link entry and exit directions to and from nodes; (4) calculating possible merging and/or eliminating of nodes; (5) saving in a database within the data unit a linked graph which is the result of steps 1-4; (6) importing linked graph/s from removable media or network device to the database; and (7) exporting linked graph/s from the database to a removable media or a network device. (e) A control unit for: (1) Activation and deactivation of the device; (2) Defining parameters necessary for the operation of the apparatus; (3) Providing control over the import and export operations.

In one option of the apparatus of WO 2004/049263, the data unit is located on the movable platform. Alternatively, the data unit may be located away from the platform.

It is one object of the present invention to provide a method and system which significantly simplify the preparation of such virtual and interactive movies which simulate the navigation of a user within a real site.

It is another object of the present invention to enable automation of at least a significant part of the preparation of such virtual and interactive movies.

It is still another object of the present invention to enable the production of such a virtual by moving a scanning apparatus within the site, without accuracy constraints and orientation measurements as generally required and preferable by the method and apparatus of WO 2004/049263.

It is still another object of the present invention to provide a much simplified scanning apparatus in comparison with the apparatus of WO 2004/049263, for the cost of some more manual editing work of the movie.

It is still another object of the present invention to provide a linked, graph-based representation of the virtual-interactive movie, which is made from a collection of photographs that are captured by the apparatus of the invention, and are manually or automatically connected to form a virtual movie.

Other objects and advantages of the invention will become apparent as the description proceeds.

SUMMARY OF THE INVENTION

The present invention relates to a method for producing an interactive virtual movie, which simulates the walking of a user within a real site and exploring the same, which comprises: (a) providing a scanning apparatus which comprises a camera, means for measuring the displacement of the apparatus relative to the site floor, and means for measuring the change of the camera field of view direction with respect to the apparatus; (b) defining minimal conditions for the capturing of a new photograph, wherein said minimal conditions comprise one or more of: (i) displacement of the apparatus by a distance D; (ii) change of the apparatus orientation by an angle $\Delta°$; or (iii) change of the orientation of the camera with respect to the apparatus by an angle of $\delta°$; (c) Using a scanning apparatus, photographing the site in two photographing modes: c.1. sequential route photographing by moving the scanning apparatus along a route, determining the values of D and $\Delta°$, and capturing a photograph each time the apparatus exceeds one of said predefined minimal conditions, wherein the measurements of said variables being reset after each of said capturing; and c.2. sequential junction photographing in which the apparatus is stationary, and the camera is rotated about an axis essentially perpendicular to the ground, and it captures a photograph every $\delta°$; (d) Storing the captured photographs; (e) Forming open chains, each open chain comprising those photographs captured during a common route photographing session, and each open chain further having a first and last photograph; (f) Forming closed chains, each closed chain comprising those photographs captured during a common junction photographing; and (g) For each of those first and last photographs of open chains that were captured adjacent to a junction, finding, from among the closed chain photographs relating to said junction, a corresponding similar photograph meeting one of the criteria of highest correlation or having the closest field of view direction, and connecting between them. Upon completion of all said closed-open chain connections, the virtual movie is ready.

Preferably, some of the first and/or last photographs of open chains are left unconnected to closed chains.

Preferably, there are some closed chains in which none of the photographs are connected to open chain photographs.

Preferably, the step of finding and connecting is performed automatically.

Preferably, the step of finding and connecting is performed manually.

Preferably, the step of finding and connecting is performed partially automatically and partially manually.

Preferably, the photographs are sequentially indexed during the photographing stage, and wherein said indexing being used in order to simplify the finding-connecting step.

Preferably, the scanning apparatus uses a 360° camera, wherein only open chains are formed, and wherein a photograph in any open chain may be connected to more than one photograph of another open chain.

The invention also relates to a movable scanning apparatus for producing an interactive virtual movie, which simulates the walking of a user within a real site and exploring the same, which comprises: (a) A supporting platform; (b) a camera which is mounted on and rotatable with respect to said platform; (c) displacement measuring means for measuring the displacement of the apparatus; (d) angular measuring means for measuring the angular rotation of the camera about an axis essentially perpendicular to the floor; and (e) controller for receiving said displacement measurements and angular measurements, and for producing a trigger to said camera to capture a photograph each time said apparatus displaces a distance above a predefined distance D, and/or each time said camera being rotated by an angle greater than $\delta°$.

Preferably, the platform is provided with wheels, and the displacement measurements are based on measuring the rotation of the wheels.

Preferably, the rotation of the wheels is measured by means of an encoder.

Preferably, the platform has the form of a tri-pod.

Preferably, the angular rotation of the camera being measured by means of an encoder.

Preferably, the apparatus further comprises means for determining the change of orientation of the apparatus, and for producing a trigger by said controller to said camera to capture a photograph each time said apparatus changes its orientation by more than a predefined value of $\Delta°$.

Preferably, the field of view direction and the accumulated x,y location of the apparatus are determined by said controller, and are associated correspondingly with each captured photograph.

Preferably, the photographs are stored in the camera.

Preferably, the photographs are immediately conveyed to the controller and stored within the controller.

Preferably, the photographs are captured at a high rate by the camera irrespective of the platform displacement, and the trigger is internal within the controller determining which of the photographs to save.

Preferably, the photographs are indexed at the time of capturing, and the index is associated with the corresponding photograph.

Preferably, the apparatus further comprises a GUI for operating the apparatus.

The invention also relates to a kit for forming the said apparatus, which comprises: (a) a supporting plate with wheels, said plate having means for accepting the bottom of legs of a conventional camera tripod; (b) a controller as stated for the apparatus above; (c) displacement measurement means on the wheels for performing displacement measurement; (d) a camera base for mechanically joining into the camera standard camera pedestal of the tripod, said base having a stationary portion which is joined into said camera pedestal and a rotatable portion having means for joining the camera; (e) angular measurement means, for measuring the angular displacement of said second base portion with respect to said first base portion; and (f) electric cables for connecting respectively between said various measurement means and the controller, between the camera and the controller, and between controller and a GUI.

Preferably, the displacement measurement means and the angular displacement measurement means are encoders.

Preferably, the supporting structure is a human being.

Preferably, the camera field of view is up to 360°.

DETAILED DESCRIPTION OF PREFERRED EMBODIMENTS

As said, WO 2004/049263 provides a system for the preparation of a virtual movie. The system comprises a movable transform which is moved within the site. Each time the platform makes a displacement above a minimal distance D, or changes its orientation by an angle above angle Δ° a photograph is captured. Moreover, each time a rotation of the camera about the platform above angle δ° is performed, a photograph is captured.

Several parameters which include at least the x;y of the platform within the site and the orientation (direction angle in °) in which the photograph was captured are associated with each photograph, which is stored in a memory storage. Then, after capturing all the images, the system of WO 2004/049263 can process all the data in order to automatically produce a virtual movie.

The system of WO 2004/049263 can prepare a movie in a relatively fast, automatic, accurate, and professional manner. However, the system of WO 2004/049263 is quite complicated and expensive, as it requires relatively complicated software and a strong processor. The inventors of the present invention have found that for the "cost" of slightly more manual editing time, a less professional virtual movie can be prepared by a much simpler and significantly cheaper system. The present invention illustrates the structure of this simplified system, and provides a method of operating the same.

Figure 1:
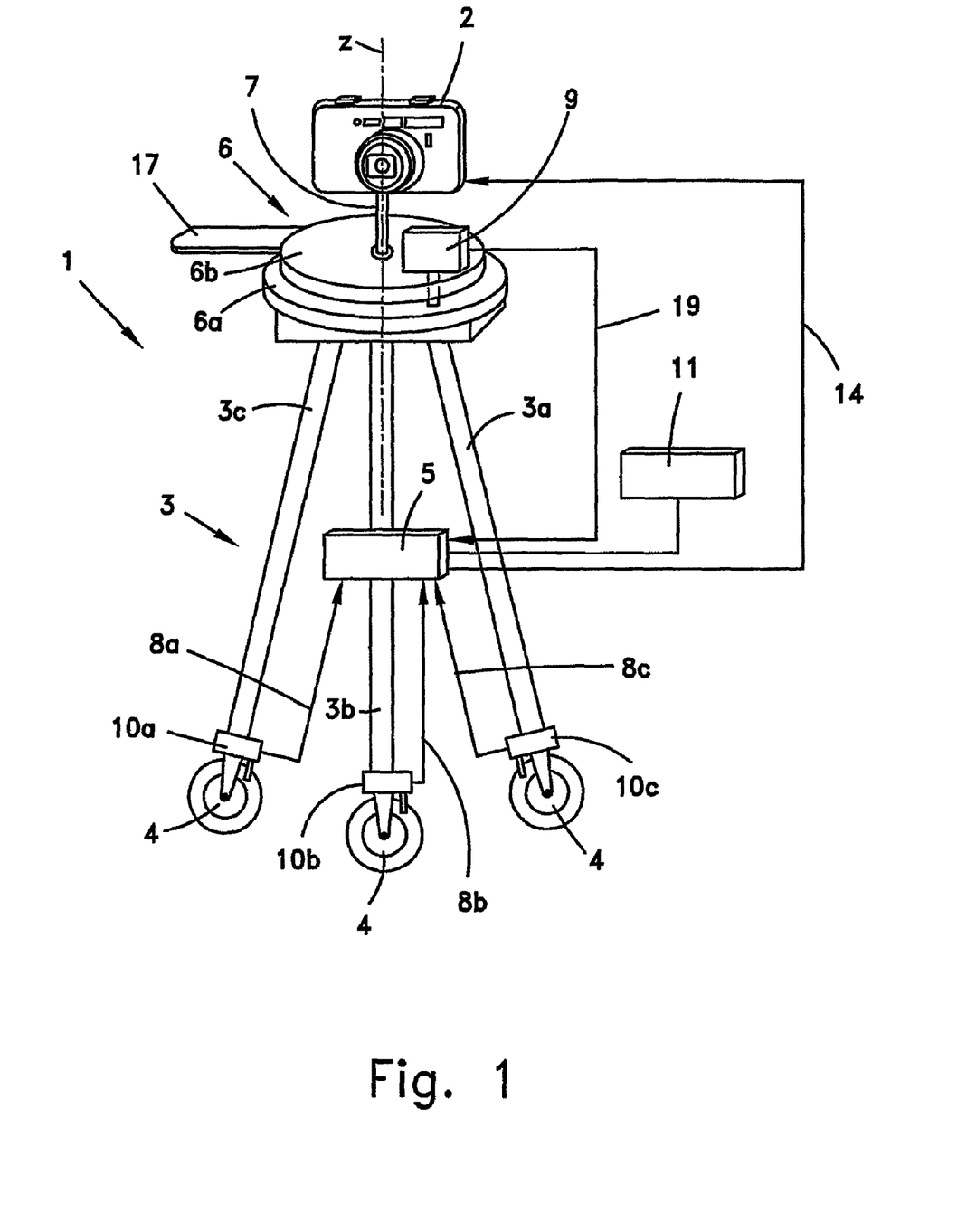
FIG. 1 schematically illustrates the basic structure of a simplified scanning apparatus 1 according to a first embodiment of the present invention.

FIG. 1 schematically illustrates the basic structure of a simplified scanning apparatus 1 according to one embodiment of the present invention. The apparatus basically comprises of a camera 2, and tri-pod 3 on which the camera is installed. Each of the tri-pod branches 3a, 3b, and 3c is mounted on a corresponding wheel, 4, enabling the mobility of the tri-pod. The branches 3a, 3b, and 3c, of tri-pod 3 comprise at their bottom displacement encoders 10a, 10b, and 10c, for measuring the angular rotation of each wheel. The corresponding wheel angular rotation measurements are then conveyed to controller 5 via corresponding cables 8a-8c. Tri-pod 3 also comprises a camera base 6, which according to this specific embodiment comprises two portions, a first portion 6a which is stationary with respect to the tripod, and a second base portion which is rotatable with respect to said firs portion. Said second portion also has a fixed rod 7 for accepting the camera 2. The angular Said second portion also has a handle enabling rotation of the camera about a central axis z which is essentially perpendicular to the ground. The angular rotation of said second portion 6b (and the camera) with respect to said first portion 6a is measured by encoder 9. The measurement of angular encoder 9 is also conveyed to controller 5. The scanning apparatus also optionally comprises a control panel 11 for the user, for activating or deactivating the scanning apparatus, for providing set-up values, and for providing commands to the apparatus.

Before the operation of the scanning apparatus, the user defines within controller 5 a set of minimal condition for the capturing of a photograph by the camera. Such minimal conditions include at least minimal displacement of tri-pod 3, and minimal angular rotation of camera 2 about central axis x. Controller 5 which receives inputs 8a-8c from the displacement encoders 10a-10c and input 19 from the angular encoder 9 initiates a trigger 14 to camera 2, which in turn captures a photograph.

Figure 2:
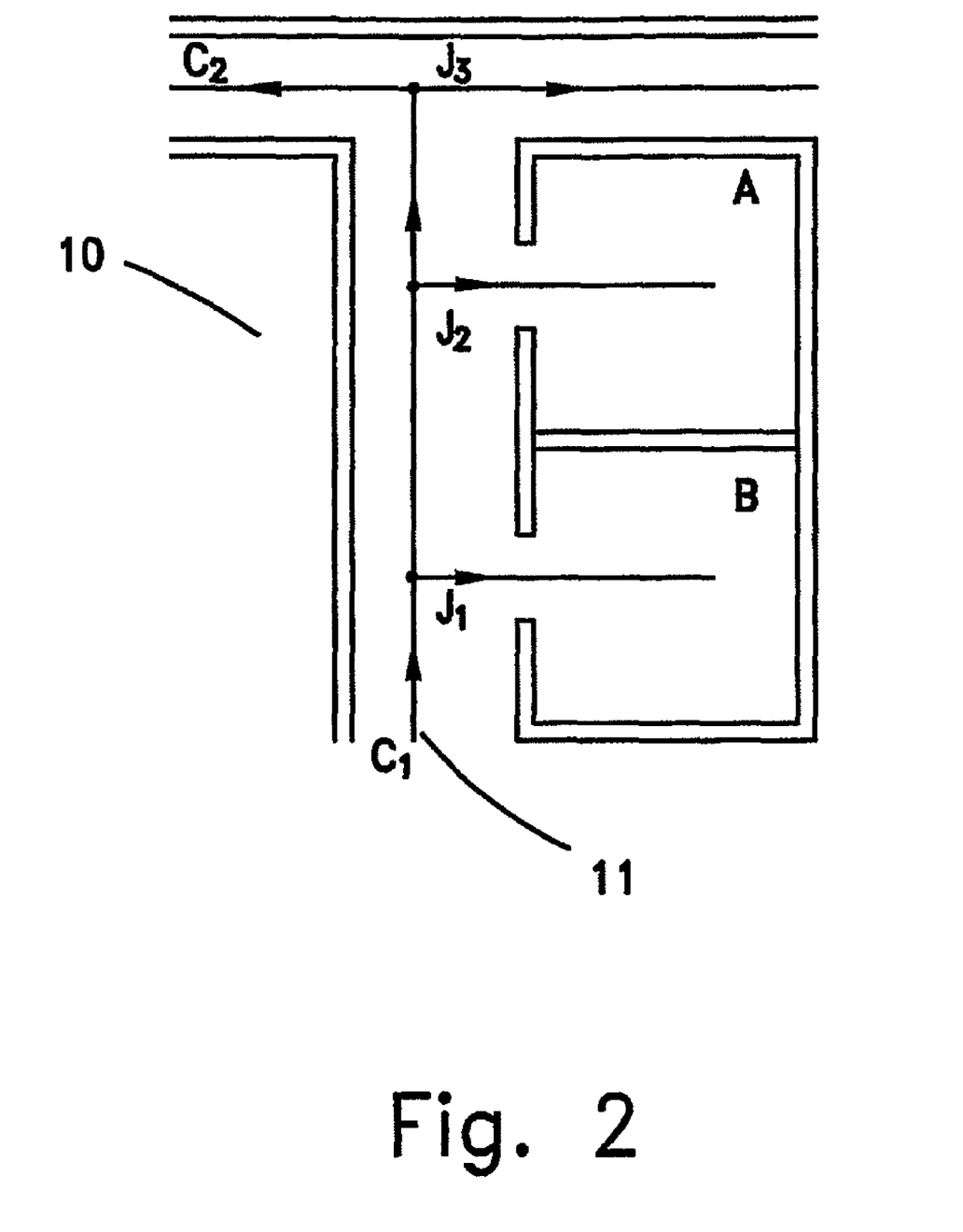
FIG. 2 shows an exemplary scheme of an office having two corridors (C1, C2) and two rooms (A, B)

FIG. 2 shows an exemplary scheme of an office 10 having two corridors (C1, C2) and two rooms (A, B). An object of the present invention is to produce a virtual movie enabling a user to navigate, i.e., to "walk" around the office. As seen, while beginning at point 11, the user walks up to junction J1, in which he may either turn right into room B or continue straight ahead. Similarly, when arriving at junction J2, the user may either turn right into room A or go straight ahead along corridor C1. When arriving at junction J3, the user may either turn to the right or to the left within corridor C2. Moreover, while walking along the corridor the user generally needs to have a relatively limited field of view. In junctions J1, J2, and J3 the user needs a wider field of view, and in rooms A and B he generally needs a field of view of 360°. For example, in junction J1 the user may select to continue along the corridor and view up to the end of the corridor, or he may select turning into room B and see the view of room B, or he may even in some cases decide to turn back and return along the corridor C1.

According to the present invention the office is filmed by means of a scanning apparatus 1 which can take photographs in up to a 360° field of view. The scanning apparatus is moved forward along the route, while capturing photographs in a relevant field of view, from filming spots. For example, the scanning apparatus may capture images every distance of 10 cm.

Figure 3:
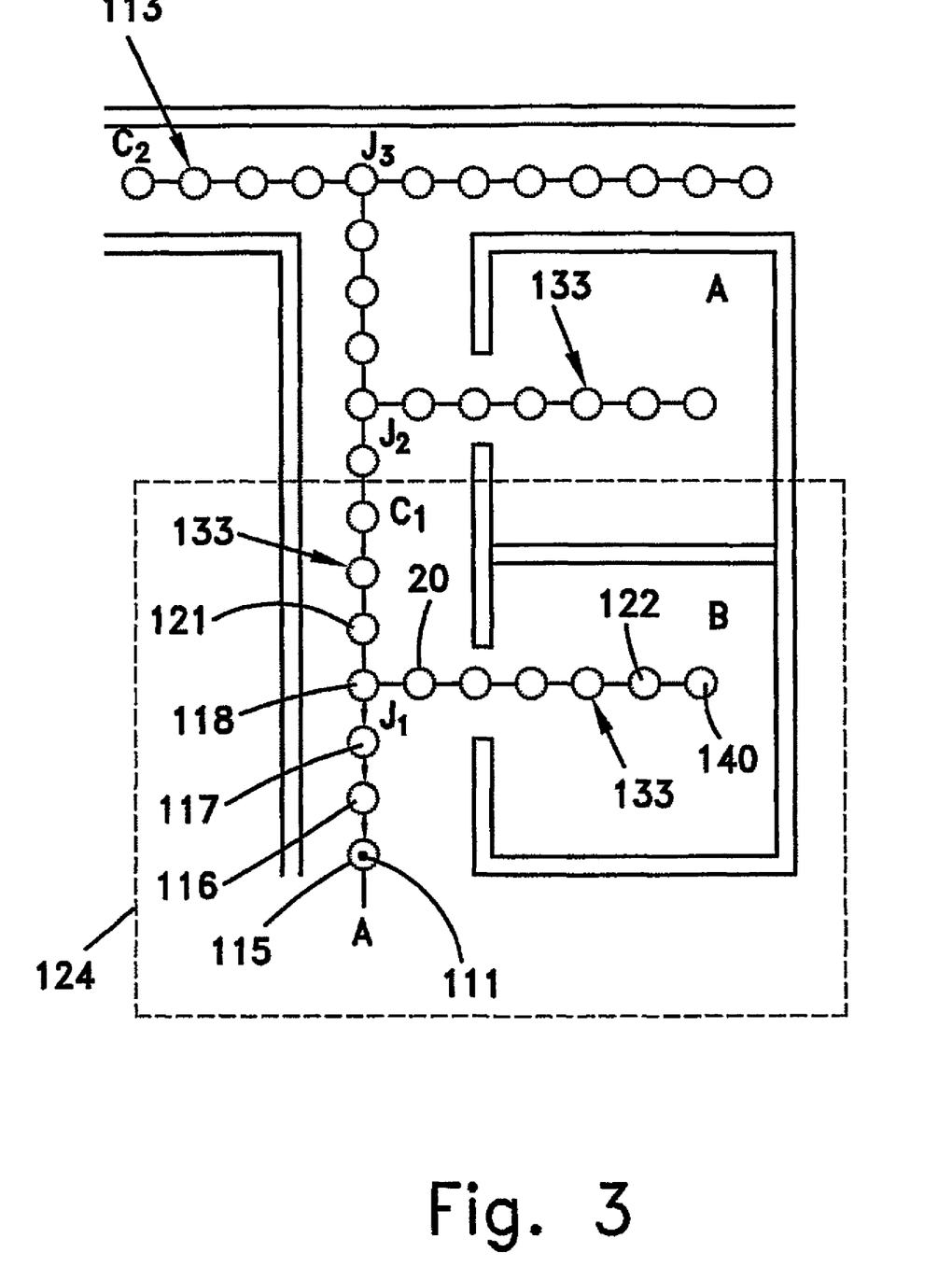
FIG. 3 illustrates a plurality of points along the route in which the scanning (filming) process is performed.

The plurality of points along the route in which the scanning (filing) process is performed are indicated in FIG. 3 as nodes 133. The nodes 133, schematically indicate in each specific node location the manner of scanning at that point, and may provide other parameters that are specific to this node.

Before the filming stage, a general plan is made regarding the routes along which the filming will be made. Along the planned routes, the nodes are created when the scanning apparatus passes a predefined distance D, which may be, for example, every 5-50 cm, or changes its angular orientation by a predefined angle Δ° (for example 5°). Moreover, in junction points where the apparatus is stationary, nodes are created upon a change of the camera field of view direction (i.e., the center of the camera field of view) above δ° with respect to the apparatus.

After generally planning the routes, said distance D between nodes, and said two parameters relating to the change in angular orientation Δ° and δ° are defined. It should be noted that measurement of distance D, for the sake of convenience, refers herein to the displacement of the center of the apparatus 1. However, distance D may be measured relative to any other defined point of the apparatus. As apparatus 1 has several wheels, the controller 5 translates the displacements as measured from the discrete wheels, and calculates the displacement D of the center of the apparatus.

Figure 4:
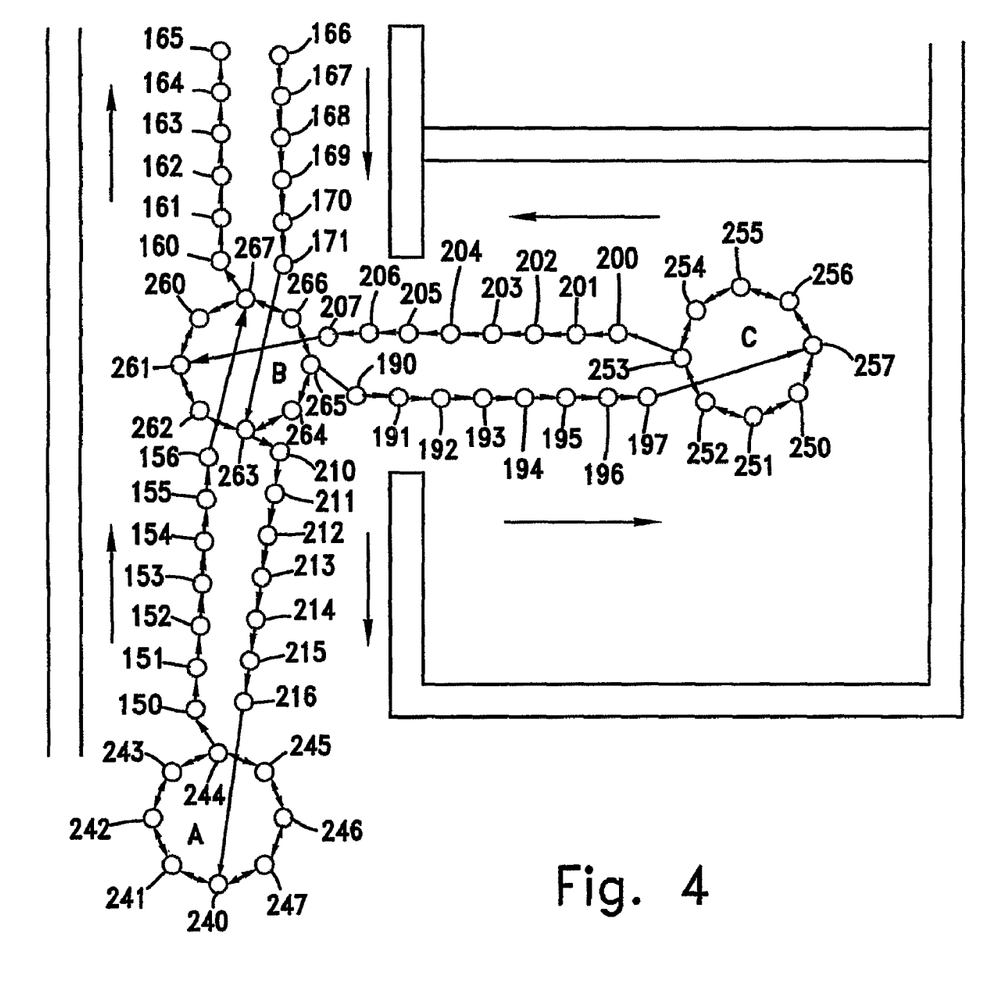
FIG. 4 shows a general scheme by which a section of an office of FIG. 3 is filmed.

FIG. 4 shows a general scheme by which the section of the office which is marked by dotted line 124 (in FIG. 3) is filmed. In principle, two types (modes) of filming exist. A "ring filming" is one in which the apparatus is stationary, the camera is rotated about central axis z, and photographs are captured every δ° of angular rotation of the camera relative to the apparatus. A second type of filming is the "route filming" in which the camera is directed toward the front of the apparatus, the apparatus moves along a route, and photographs are captured each time the apparatus passes a distance above D as defined, or when the apparatus orientation changes above angle Δ°. It should be noted that the verification of δ°, D, and Δ°, is reset each time a photograph is captured.

In one embodiment of the present invention the camera 2 is a still camera having a field of view of, for example, 60°. In operation, the scanning apparatus 1 is initially positioned at a starting point, for example point A of FIG. 4. In the example of FIG. 4, point A is a junction point, and the camera is rotated about axle x, and therefore it captures a photograph every δ° in a "ring filming" manner. For example, the camera 2 may be rotated 360°, and may create 72 photographs (assuming δ° is defined as 5°). In FIG. 4 fewer photographs are shown in the junction points for the sake of brevity; for example photographs 240 to 247 are captured in junction A. Next, the scanning apparatus 1 is pushed along the corridor. Each time the controller 5 detects a displacement of the apparatus above a distance D, as predefined, a trigger 14 is initiated by the controller to the camera 2 to capture a photograph. In such a manner, upon moving from junction A to junction B, photographs 150 to 156 are captured in a "route filming" manner. Then, junction B is filmed in a "ring filming" manner similar to the manner as carried in junction A and will result in photographs 260-267. From junction B the filming may continue along the route up to junction C filming photographs 190 to 197, again in a "route filming" manner. Then, junction C, which includes photographs 250 to 257 is filmed in a "ring filming" manner Upon completion of junction C, the filming may continue in the reverse direction, filming first the sequence of photographs 200 to 207, and then the sequence of photographs 210 to 216.

During the filming process, the captured photographs are stored, and preferably indexed for the sake of convenience. Upon completion of the filming process, the stored collection of photographs contains several route photograph sequences, and several ring photograph sequences. Next, the captured photographs need to be separated into chains. A chain is a sequence of photographs wherein, for which photograph in the sequence, there is a definition of a previous photograph in the sequence and a next photograph in the sequence. An open chain is a chain in which two photographs (also referred to herein as "first photograph" and "last photograph" respectively) have only one connection to a next or previous photograph respectively. A special type of an open chain is a "chain" of a single photograph which does not have a definition for a previous or next photograph, as it performs as both a "first photograph" and as a "last photograph" in the chain. A closed chain is a sequence in which each and every photograph in the sequence has exactly two connections to both previous photograph and to next photograph. Therefore, it is clear that those sequence photographs which were captured in a specific junction (for example photographs 240-247 captured in junction A) form a closed chain, and those photographs that were captured along a route (for example photographs 150-156) form an open chain.

The separation of the collection of the captured photographs into chains may be made in several ways, for example:

a. The indexed way: Assuming that the photographs are sequentially indexed, during the filming process the first and last indexes of each sequence are recorded (manually or automatically) together with the sequence type. Then, the connection between the chain photographs (previous and next) is trivial, as it is directly evolved from the sequential order of the filming. In the case of a ring filming, the closed chain is formed by defining that the last photograph in the sequence is the previous photograph to the first photograph in sequence and vice versa that the first photograph in the sequence is the next photograph to the last photograph in sequence. This is the preferable way which enables most convenient way of separation.

b. The non-indexed way: In the case that the photographs are not indexed during the filming, the separation into chains may be made visually or by applying image processing algorithms. The final result of the processing is essentially the same as in the above indexed way; however, the non-indexed process is generally less efficient.

Having made the separation into chains, there are now several of open chains each containing photographs that are captured along a common route and several closed chains, each containing photographs that are captured in a common junction. In order to produce a continuous movie, the separate chains have to be connected. In general, the last and/or first photograph of each open chain has to be connected to a single photograph of a corresponding closed chain. For example, and referring to FIG. 4, the first photograph 150 of the open chain comprising photographs 150-156 (hereinafter, and for the sake of brevity the chain will be referred to as "chain 150-156") has to be connected to one of the photographs of closed chain 240-247. As a general rule, the selected photograph from chain 240-247 that is connected to photograph 150 is the one having the most similarity, i.e., the highest correlation with photograph 150, or having the closest field of view direction. In some cases, a combination between said two considerations may be made (hereinafter, a case which satisfies said one or two considerations will be referred herein as "best mach"). The best match is desirous in order to ensure a "smooth" view of the movie, particularly when the viewer transfers between a specific end photograph of the open chain to the closed chain photograph connected to it, or vice versa. Therefore, in the case of FIG. 4 it can be seen that photograph 244 of chain 240-247 has the best match with the first photograph 150 of chain 150-156, as both "look" to almost the same direction (12 o'clock direction in the scheme). Likewise, photograph 240 of chain 240-247 has the best match with the last photograph 216 of chain 210-216. Therefore, a connection is made between photograph 244 and photograph 150, and between photograph 216 and photograph 240 in order to form a continuous and smooth section of the movie. Likewise, for the same considerations photograph 197 is connected to photograph 257 (both "looking" essentially to 3 o'clock direction), and photograph 253 to photograph 200 both "looking" essentially to 9 o'clock direction). In a similar manner all the separate chains are connected to form a continuous and full virtual movie in which the user can navigate. It should be noted that the movie may include stand-alone chains, i.e., chains that are totally separated from all other chains.

The connection between chains as discussed above can be performed, for example, in three optional ways:
- a. Manual: As there is a limited number of end photographs (i.e., first and/or last photographs that have to be correspondingly connected to photographs of closed chains) this task can be performed manually. In that case, the editor of the movie who wishes to connect an end photograph can relatively easily find the desired photograph from the relevant (candidate) closed chain in a visual manner and make the connection accordingly. For example, with reference to FIG. 4, the user may display on the right side of his screen the end photograph 150, and on the left side of the screen he may alternately replace all photographs of junction A (i.e., of closed chain 240-247), in order to find among them the best match photograph according to his best intuition (that most probably will result in selecting photograph 244, which satisfies said best mach criteria).
- b. Automatic: The same task can also be performed automatically by means of a correlator. Having a given end photograph of a chain, and an adjacent close chain containing a plurality of photographs, the correlator looks for the one photograph in the closed chain having the highest correlation with said given photograph, and makes the connection accordingly.
- a. Furthermore, when optionally the x,y coordinates of the site where each photograph has been captured, and even more preferably also the field of view direction for each photograph are recorded, using this data may even further simplify the automation of the process (however, as said this may complicate the system). This automatic procedure may be performed in real time during the filming, or immediately after filming the movie photographs.
- c. A mixed automatic and manual: Some parts of the movie editing may be performed manually in a visual manner, and other part automatically by means of a correlator.

The above description has mentioned that each end photograph of an open chain is connected to one photograph of a closed chain. This rule is generally correct for cases where a conventional camera is used. An exception case is where a 360° field of view camera is used. In that case the apparatus produces only open chains, and there may be photographs of open chains that are connected to several other photographs, each belonging to another corresponding chain. The connection between the photographs may be performed by one of the three ways described above.

As said, the invention assumes that the virtual movie is a collection of photographs, some of which are captured along routes and others in junctions of a physical site. This is translated in the present invention to a linked graph of photographs in which each photograph represents a specific field of view as seen from a specific location in the site. The links between photographs allow virtual movement from one photograph to another in a smooth manner.

As said above, in one embodiment of the invention, a tri-pod 3 with wheels is used for supporting the camera and the associated system components. It should be noted that the supporting apparatus does not necessarily have the form of a tri-pod, but it may have other forms, as long as the x;y displacement of the wheels of the apparatus is measured and provided to controller 5 for determining when to initiate a trigger 14 for capturing a new photograph.

Figure 5:
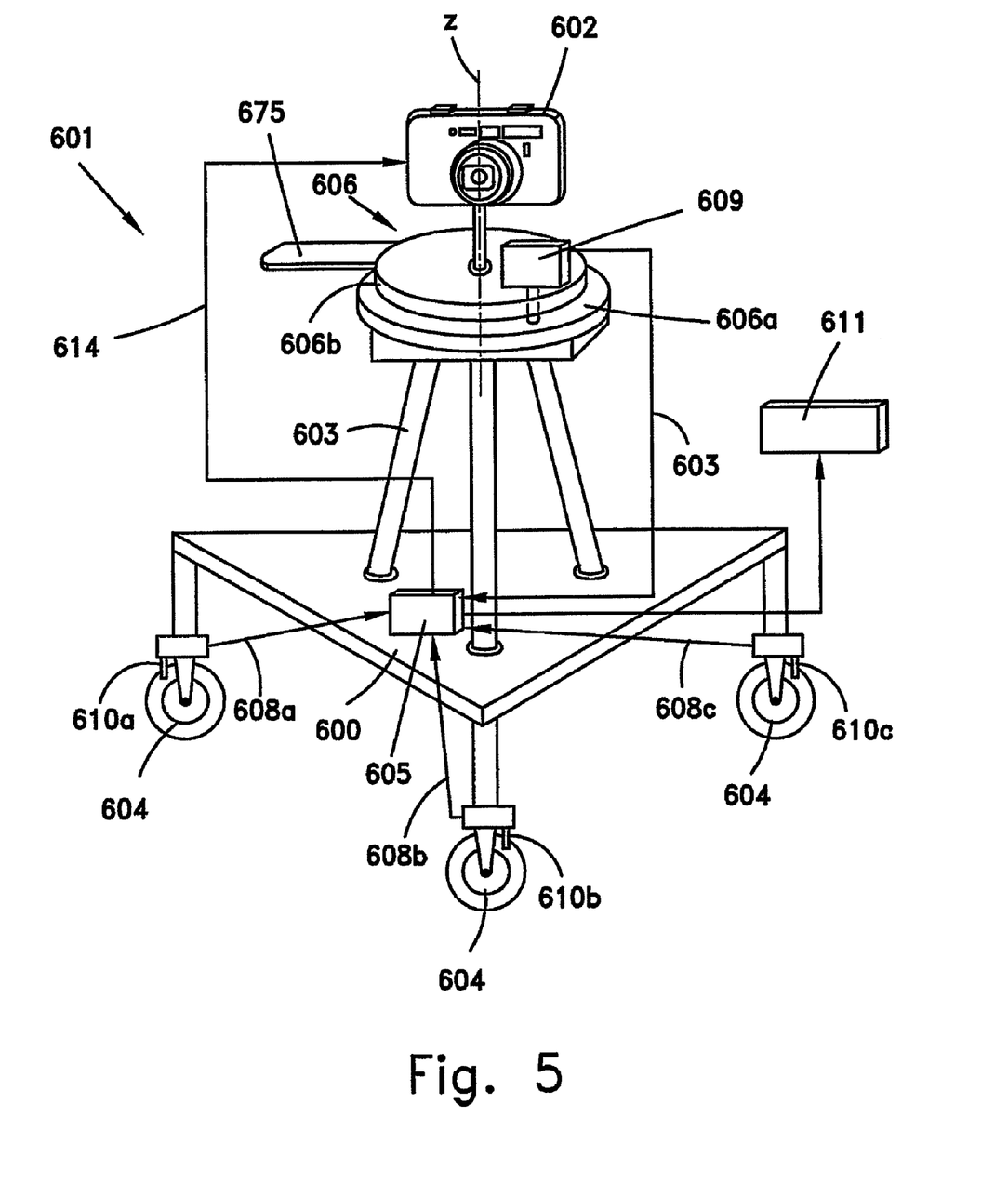
FIG. 5 shows a kit adapted for a standard tri-pod and a standard camera, for carrying out the filming of the virtual movie according to an embodiment of the invention.

FIG. 5 shows a kit 601 adapted for a standard tri-pod and a standard camera, for carrying out the filming of the virtual movie according to an embodiment of the invention. The system which includes the kit forms essentially the same system of FIG. 1, and therefore components having similar numbers perform a similar function as in FIG. 1. A standard tri-pod 603 is mounted on a triangular base 600 in a fixed position. The base 600 includes the wheels 604 and encoders 610*a*-610*c* for measuring the displacement of the wheels, and provides the displacement indications to controller 605. The controller is preferably mounted on the base 600. The kit also comprises a camera orientation adapter 606, which is mounted on top of standard tri-pod 603, essentially in the same manner that a conventional camera is generally mounted. The adapter essentially mechanically buffers between tri-pod 603 and camera 602 or in some cases between tri-pod 603 and a tri-pod head (not shown) on which the camera 602 is mounted. The adapter preferably comprises two portions, a first portion 606*a* which is stationary with respect to the tri-pod 603, and a second portion 606*b* which is rotatable with respect to said first portion, for example by means of handle 675. The adapter further comprises an orientation encoder 609, which measures the relative angular displacement of said second portion 606*b* with respect to said first (stationary) portion 606*a*. The camera 602 is stationary with respect to said second portion 606*b*, and therefore any angular rotation of the second portion rotates also the camera 602. The rate of rotation is measured by encoder 609 and conveyed to controller 605. The kit also comprises control panel 611 having the functionality essentially the same as of control panel 11 of FIG. 1. The controller 605 provides triggers 614 to camera 602, essentially the same as described with respect to FIG. 1. The kit may also include a battery (no shown), which may also be mounted on base 600.

Figure 6:
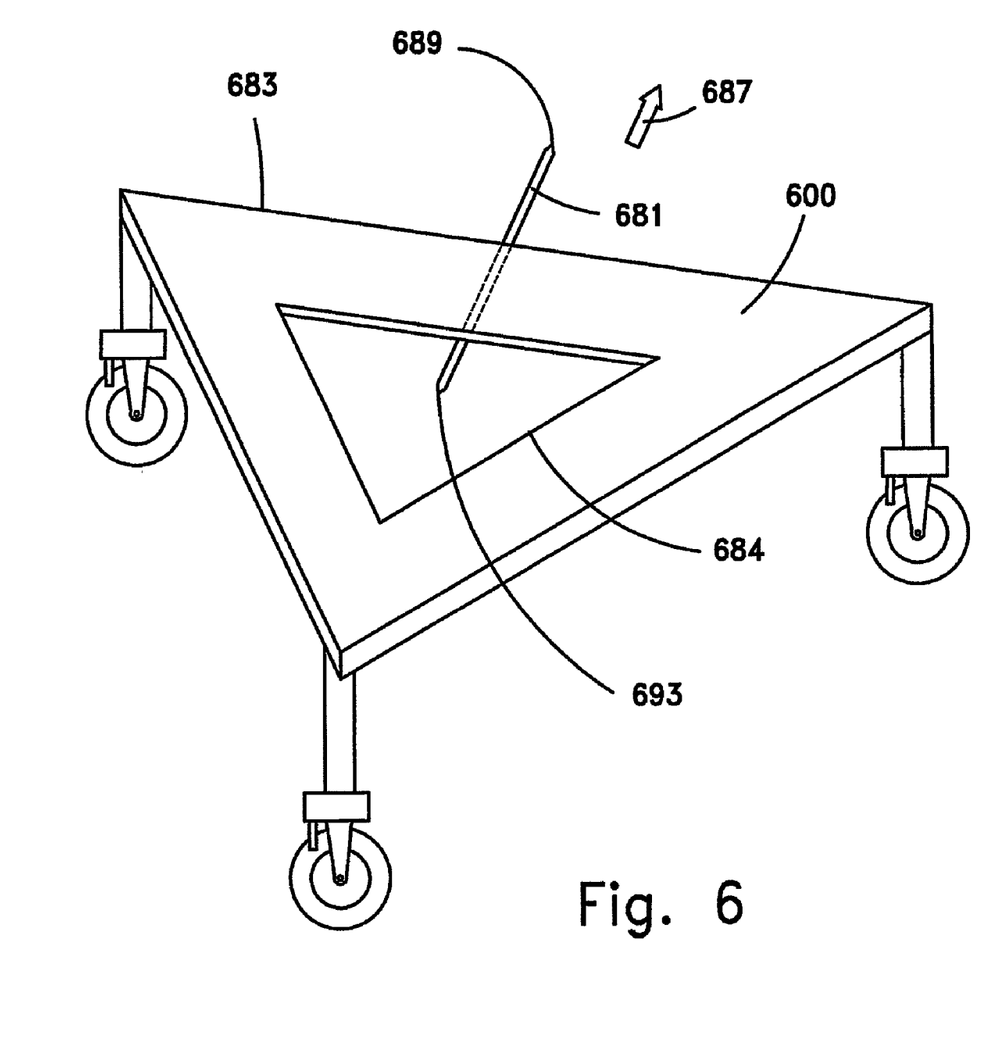
FIG. 6 illustrates an embodiment of base 600, having a guiding assisting means.

FIG. 6 illustrates an embodiment of base 600, having a guiding assisting means. It has been found that in order to locate the center of the apparatus (or any other predefined point) at a specific location relative to the floor, or in order to guide the apparatus along a guiding line marked on the floor, the adding of guiding means 681 is preferable. Guiding means 681 is positioned perpendicular to side 683, preferably extends therefrom, and ends at the center 693 of the apparatus below base 600. Side 683 is the side which is perpendicular to the apparatus progression direction 687. The central portion 684 of base 600 is hollow, such that the user can view the floor and the center of the apparatus 693 relative to the floor. Furthermore, the user can also view the front 689 of same guiding means 681 relative to the floor. The guiding means 681 may be, for example, a straight rod which is positioned perpendicular to side 683, or a laser mark, forming a straight illuminated line on the floor, the first end 693 of which marks the center (or any other predefined point) of the apparatus, and the second end of which extends from side 683 and marks the direction perpendicular to side 683 of base 600. In one embodiment, only the central point 693 may be marked relative to the floor, for example by means of a laser marker, or any other conventional means.

It should be also noted the apparatus may also comprise conventional means (such as a handle) for pushing the apparatus. Alternatively, the apparatus may be provided with a driving motor for moving the apparatus, which may be controlled by means of a remote control. Furthermore, the rotation of camera 602 about axis z may also be motorized and controlled by means of a remote control. Also, it should also be noted that the controller may be replaced by a computer of any type, and that this may also comprise a means for playback of the captured photographs, and/or of the virtual movie.

Figure 7:
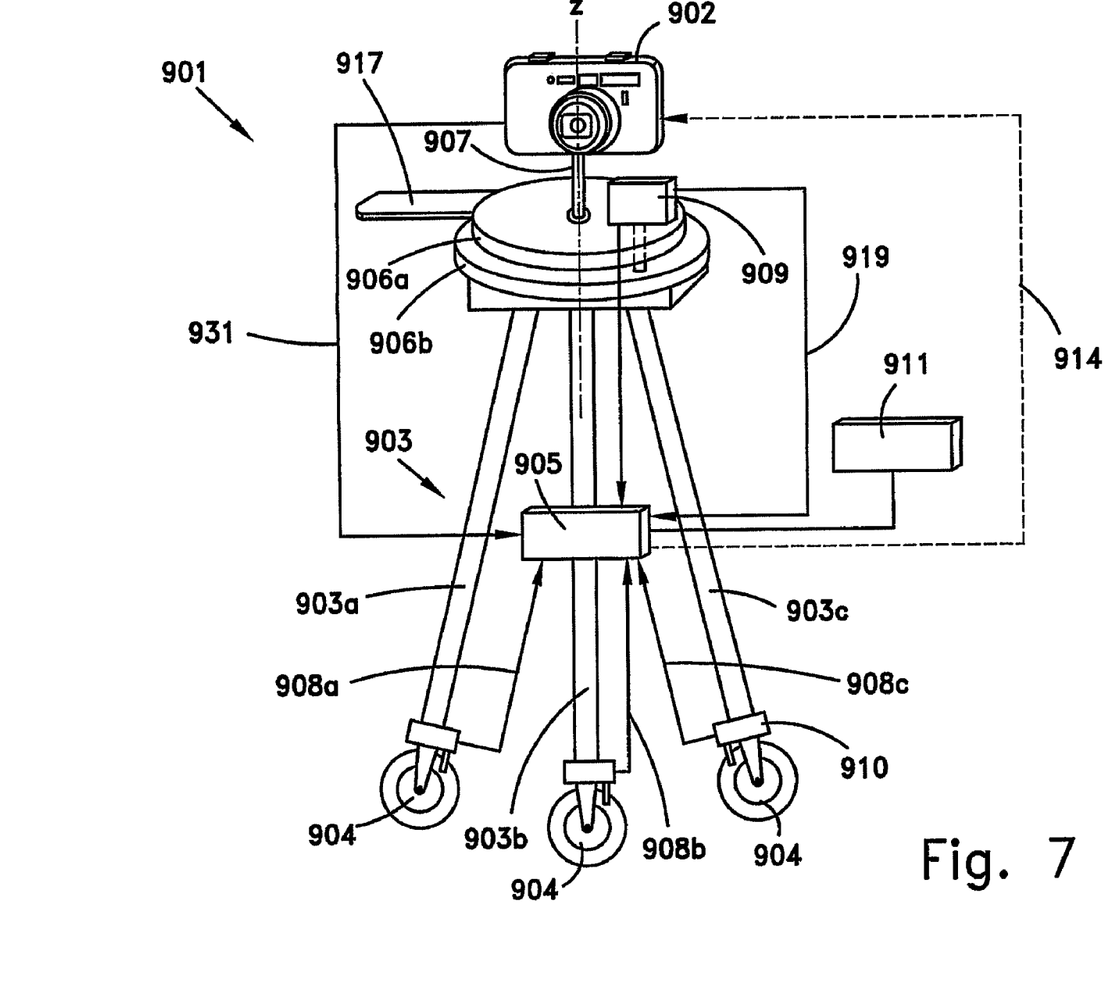
FIG. 7 describes still another embodiment of the scanning apparatus according to the present invention.

FIG. 7 describes still another embodiment of the invention. While in the previous embodiments the captured images were stored in the camera 2, according to the embodiment of FIG. 7 the images are simultaneously conveyed via line 931 to the controller 905 and stored there. The controller 905 of this embodiment may be, for example, a computer of any type. In one embodiment, the camera 902 is a video camera, which continuously conveys images to the controller. The controller 905 in turn produces an internal trigger (not shown) which determines and selects the images among all those that are captured that are finally stored. The internal trigger is issued essentially according to the same criteria as of trigger 14 of the embodiment of FIG. 1. The remaining images are ignored. In still another embodiment, the camera 902 is a still camera, and the trigger 914 initiates capturing of an image (as before). In contrast to the embodiment of FIG. 1 where the images were stored in camera 2, the images of the embodiment of FIG. 7 are immediately conveyed via line 931 to the controller (or computer) 905 and stored there.

The embodiments of the invention which have been described so far have used encoders for determining the displacement of the apparatus and the angular change of the camera. This type of measurement has been given only as an example, as the apparatus displacement and the angular change may be measured in other ways known in the art. For example, the displacement may be measured in a manner as described in PCT/IL2005/001105. Alternatively the displacement measurement may be made by means of a radio based Indoor positioning systems as described, for example, in GRIPS Generic Based Indoor Positioning Systems, Magedanz et. Al., http://www.fokus.gmd.de/bereichsseiten/kompetenzzentrum/meteor/theme n/lokalisierung/28_GRIPS_PAPER_VVPNC_Fraunhofer-_FOKUS_FINAL_formated.pdf. In the latter case, there is even no need for any structure with wheels for moving the apparatus. In that case, the whole system portions may be carried by a person, while the radio or other displacement measurements initiate triggers to the camera. The camera is preferably a 360° camera, or a camera that can rotate 360°.

As disclosed in WO2004/049263, the field of view of the camera CFOV (i.e., the field of view of the photograph) may be larger than the UFOV; i.e., the field of view that is displayed to the user. In that case, the UFOV has to be predefined, and the entry and exit angles need also to be defined for each photograph. The definition of the entry and exit angles may be made either manually or automatically for each pair of photographs. In order to enable automation in defining the entry and exit angles, it is preferable that the apparatus associates an orientation measurement indicating the field of view direction in which each photograph has been captured.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A movable scanning apparatus for producing an interactive virtual movie which comprises open photographs chains and closed photographs chains connected together, which simulates the walking of a user within a real site and exploring the same, comprising:
   a. a supporting platform;
   b. a camera which is mounted on and rotatable with respect to said platform;
   c. displacement measuring means for measuring the displacement of the apparatus;
   d. first angular measuring means for measuring the angular orientation of the platform with respect to the floor;
   e. second angular measuring means for measuring the angular change of rotation of the camera about an axis perpendicular to the floor,
   f. a controller for receiving said displacement measurements as measured by the displacement measurement means and said first and second angular measurement means respectively, and for producing a trigger to said camera to capture a photograph at least each time said apparatus displaces a distance above a predefined distance D value, and/or each time the apparatus changes its orientation by an angle greater than a predefined $\Delta°$ value, or when said camera is rotated by an angle greater than a predefined $\delta°$ value, and
   wherein the measurements of said D, $\Delta°$ and $\delta°$ values are reset and newly
   measured after each of said photograph capturing;
   and wherein said apparatus captures photographs from the site in two photographing modes:
   a. sequential route photographing for creating open chains, in which the scanning apparatus is moved along a route, while capturing a photograph at least each time one of said measurements exceeds respectively a predefined minimal value of D, $\Delta°$, or $\delta°$, and upon each capturing forming connection between the currently captured photograph and the previously captured photograph until the last photograph in the chain; and
   b. sequential junction photographing for creating closed chains, in which the apparatus is stationary, and the camera is rotated about an axis perpendicular to the ground, while capturing a photograph at least each time the measurement of $-\delta°$ exceeds said predefined $\delta°$ value, and upon each capturing forming connection between the currently captured photograph and the previously captured photograph until the last photograph in the chain, which is also connected to the first photograph in the chain;
   and wherein the apparatus further comprises a storage for all the created chains, and a processing unit for, each of the first or last photographs of open chains that were captured adjacent to a junction, finding from among closed chain photographs relating to same adjacent junction, a corresponding similar photograph meeting one of the criteria of highest correlation or having the closest field of view direction, and for connecting between them.

2. Apparatus according to claim 1, wherein an accumulated x,y location of the apparatus is determined by said controller, and is associated respectively with each captured photograph.

3. Apparatus according to claim 1, wherein one or more of (a) the camera field of view direction and (b) the accumulated x,y location of the apparatus are further determined by said controller, and are associated respectively with each captured photograph.

4. Apparatus according to claim 1, wherein the platform has the form of a tri-pod.

5. Apparatus according to claim 1, wherein the photographs are stored in the camera.

6. Apparatus according to claim 1, wherein the photographs are immediately conveyed to said controller and stored within the controller.

7. Apparatus according to claim 6, wherein the photographs are captured at a high rate by the camera irrespective of the platform displacement, and wherein the trigger is internal within the controller determining which of the photographs to save.

8. Apparatus according to claim 1, wherein photographs are indexed at the time of capturing, and wherein the index is associated with the corresponding photograph.

9. Apparatus according to claim 1, wherein the supporting structure is a human being.

10. Apparatus according to claim 1, wherein the camera field of view is up to 360°.

11. Apparatus according to claim 1, provided in a form of a kit, wherein:
  a. said supporting platform comprises a supporting plate with wheels, said plate having means for accepting the bottom of legs of a conventional camera tripod;
  b. said angular measuring means comprises (i) a camera base for mechanically joining to the camera a standard camera pedestal of said tripod, said base having a stationary portion which is joined to said camera pedestal and a rotatable portion having means for joining the camera, wherein the angular measurement indicates the angular displacement of said rotatable portion with respect to said stationary portion; and
  c. electric cables are also provided for connecting respectively between said various measurement means and the controller, between the camera and the controller, and between the controller and a GUI.

* * * * *